(12) United States Patent
Eiselstein (10) Patent No.: US 12,055,122 B2
(45) Date of Patent: Aug. 6, 2024

(54) TIDAL ENERGY CONVERTER

(71) Applicant: Ronald Simeon Eiselstein, Youngstown, OH (US)

(72) Inventor: Ronald Simeon Eiselstein, Youngstown, OH (US)

(*) Notice: Subject to any disclaimer, the term of this patent is extended or adjusted under 35 U.S.C. 154(b) by 110 days.

(21) Appl. No.: 17/766,065

(22) PCT Filed: Oct. 1, 2020

(86) PCT No.: PCT/US2020/053751
§ 371 (c)(1),
(2) Date: Apr. 1, 2022

(87) PCT Pub. No.: WO2021/067566
PCT Pub. Date: Apr. 8, 2021

(65) Prior Publication Data
US 2022/0316440 A1    Oct. 6, 2022

Related U.S. Application Data (60) Provisional application No. 62/909,911, filed on Oct. 3, 2019.

(51) Int. Cl.
*F03B 13/00* (2006.01)
*F03B 13/26* (2006.01)

(52) U.S. Cl.
CPC .......... *F03B 13/262* (2013.01); *F03B 13/266* (2013.01)

(58) Field of Classification Search
CPC ... F03B 13/262; F03B 13/266; F05B 2240/91
See application file for complete search history.

(56) References Cited

U.S. PATENT DOCUMENTS

| | | | |
|---|---|---|---|
| 2,499,715 A * | 3/1950 | Blevins | F03B 17/02 60/640 |
| 4,612,768 A | 9/1986 | Thompson, Jr. | |
| 4,691,514 A * | 9/1987 | Smith | F03B 17/025 60/506 |
| 5,426,332 A | 6/1995 | Ullman et al. | |
| 5,872,406 A | 2/1999 | Ullman et al. | |
| 5,970,713 A * | 10/1999 | Iorio | F03G 3/00 60/640 |
| 8,796,877 B2 * | 8/2014 | Shinohara | F03B 17/025 60/495 |
| 9,121,383 B2 * | 9/2015 | Nugent | F03B 7/00 |
| 11,143,157 B1 * | 10/2021 | Ackman | F03B 17/06 |
| 2013/0134714 A1 | 5/2013 | Daqian | |

(Continued)

FOREIGN PATENT DOCUMENTS

WO    2008/132607 A2    11/2008

*Primary Examiner* — Julio C. Gonzalez (57) ABSTRACT

A tidal energy converter has a pivoting lever that moves in response to tidal fluid moving other elements on the converter. The pivoting lever can be operatively coupled with an electricity generator to produce electricity. Namely, the pivoting lever may be coupled to an air source and compress the air to create a compressed air. The compressed air may be used to power an electricity generator. The pivoting lever is moved by fluid that empties from a feed tank to a spill tank. There may be one or more ballast tanks connected to the feed tank and/or the spill tank. Some of the feed tanks work in opposing unison with one of the ballast tanks.

2 Claims, 5 Drawing Sheets

(56) References Cited

U.S. PATENT DOCUMENTS

2015/0260152 A1   9/2015 Dehlsen
2016/0319798 A1  11/2016 Blodgett et al.
2017/0363058 A1  12/2017 Etherington

* cited by examiner

TIDAL ENERGY CONVERTER

CROSS REFERENCE TO RELATED APPLICATIONS

The present disclosure claims priority to U.S. Provisional Patent Application Ser. No. 62/909,911, filed on Oct. 3, 2019, the entirety of which is incorporated herein by reference as if fully re-written.

TECHNICAL FIELD

The present disclosure relates to energy conversion. More particularly, the present disclosure relates to a device for converting tidal forces into electromechanical energy.

BACKGROUND

Background Information

It is predicted that the long term trend in fossil fuel prices is likely to increase due to diminishing global oil and gas reserves, alternative (preferably renewable) energy generation systems have become an increasingly significant topic of interest for countries around the world, particularly as fossil fuel production threatens to continue unabated. Further, Nikola Tesla has been quoted as saying "[t]he universal utilization of water power and its long-distance transmission will supply every household with cheap power and will dispense with the necessity of burning fuel." As a result, significant time, resources, and funding have been invested to research and develop alternative electrical energy generation systems utilizing such renewable sources as solar power, water flow, wind power and the like to supply ever-increasing amounts of energy. One relatively untapped renewable energy source receiving increased attention is the potential energy that might be harnessed from ocean movement, such as the potentially endless energy source inherent in the constant tidal, wave, and/or current flows of the ocean.

The potential for generating electrical energy from the action of ocean phenomena generally comes in three sources: ocean thermal power, wave power, and tidal power. Ocean thermal power generation takes advantage of the difference in temperature between cooler deep water and warmer surface water that becomes heated by the sun; that thermal differential is then used to operate a heat engine for generating electricity. Ocean thermal power generation, however, is expensive, has very low thermal efficiencies, and may require equipment that can be an eye sore if located near populated areas. Furthermore, ocean thermal power generation requires large temperature gradients or differentials to function adequately. In many areas of the ocean, the actual thermal differential is not large enough to generate significant amounts of electrical energy to meet demand.

Wave power generation takes advantage of the waves generated on the ocean surface when wind interacts at the free surface of the water. Wave power generation is, however, highly dependent on wavelength and thus only suitable to specific locations of the ocean where large wavelengths are present. Wave power is also unreliable because wave quality is irregular and difficult to forecast, leading to unreliable energy generation. Similar to ocean thermal power, wave power may cause noise or visual pollution if wave energy generators are located near a populated area.

Tidal power generation techniques are expected to take advantage of the differences in the surface level of an ocean or similar body of tidal water due to the gravitational effects of the moon. The vertical difference in the surface level during tidal changes represents potential energy that holds promise for electrical power generation, and is particularly desirable because it follows a relatively regular pattern. Technology using tidal action as a source for energy generation is still in its relative infancy. One known tidal energy generation system utilizes large turbines placed in tidal streams in order to take advantage of the flow of water during tidal changes. A tidal stream is a relatively fast-flowing body of water that is created by the rising and falling of the tide; the turbines are positioned to capture the horizontal flow of water and thereby generate electricity. The fast-flowing water is thus directed through the turbine, which rotates a shaft attached to a magnetic rotor that converts the mechanical energy into electrical energy. These turbines are relatively expensive and may also require significant maintenance over their lifetime, thus increasing operating costs.

Another known method of harnessing tidal energy involves the use of a barrage. A barrage is a large dam where water spills over the dam as the tide rises. The overflowing water may be passed through a turbine, which rotates a shaft attached to a magnetic rotor that converts the mechanical energy into electrical energy. This process of using a barrage suffers from similar downsides as the tidal stream process and is limited to areas where a dam may be constructed such as tidal rivers, bays, and estuaries.

Other known tidal energy systems require the construction and placement of machinery such as hydraulics and moveable tanks that extend far above the surface of the water, such as described in U.S. Pat. Nos. 5,426,332, 5,872,406, U.S. Patent Application Publication No. 2013/0134714, and U.S. Patent Application Publication No. 2016/0319798. As another example, a known tidal energy system may require the construction of a large reservoir on land that must be filled so that a large duct system may capture the flow of water, as described in U.S. Pat. No. 4,288,985. Such tidal energy systems require large structures that are built either above the water or on shore, requiring significant costs in engineering and land.

SUMMARY

A need therefore exists for an efficient and cost-effective energy conversion/electrical power generation system that can harness the potential and kinetic energy of tidal action as the water level rises and falls and/or as the water ebbs and flows due to changing tidal action and produce electrical power for subsequent consumption.

In one aspect, an exemplary embodiment of the present disclosure may provide a tidal energy converter comprising: a housing mounted in a waterway that has a high tide level and a low tide level; a lever within the housing that pivots about a fulcrum; a first feed tank within the housing having a discharge outlet in fluid communication with the lever; a first ballast tank in operative communication with the first feed tank exterior to the housing; a second feed tank within the housing having a discharge outlet in fluid communication with the lever opposite the first feed tank relative to the fulcrum; a second ballast tank in operative communication with the second feed tank exterior to the housing; a third ballast tank exterior the housing; a first spill tank exterior the housing in fluid communication with the first feed tank and in operative communication with the third ballast tank; a fourth ballast tank connected to the first spill tank; a fifth ballast tank exterior the housing; a second spill tank exterior to the housing in fluid communication with the second feed tank and in operative communication with the second spill tank; and a sixth ballast tank connected to the second spill tank.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
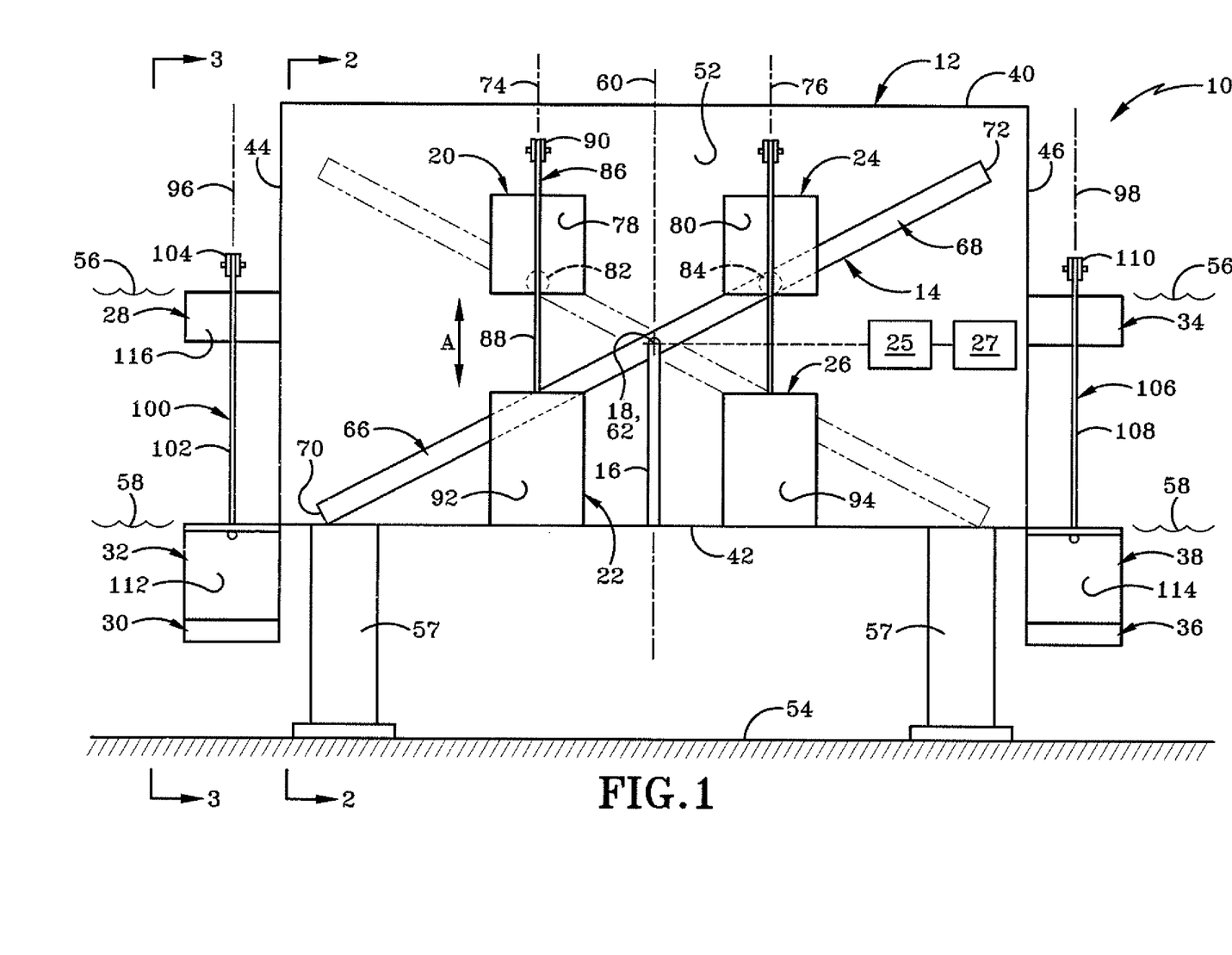
FIG. 1 (FIG. 1) is a diagrammatic elevation view of a tidal energy converter in accordance with the present disclosure.
Figure 2:
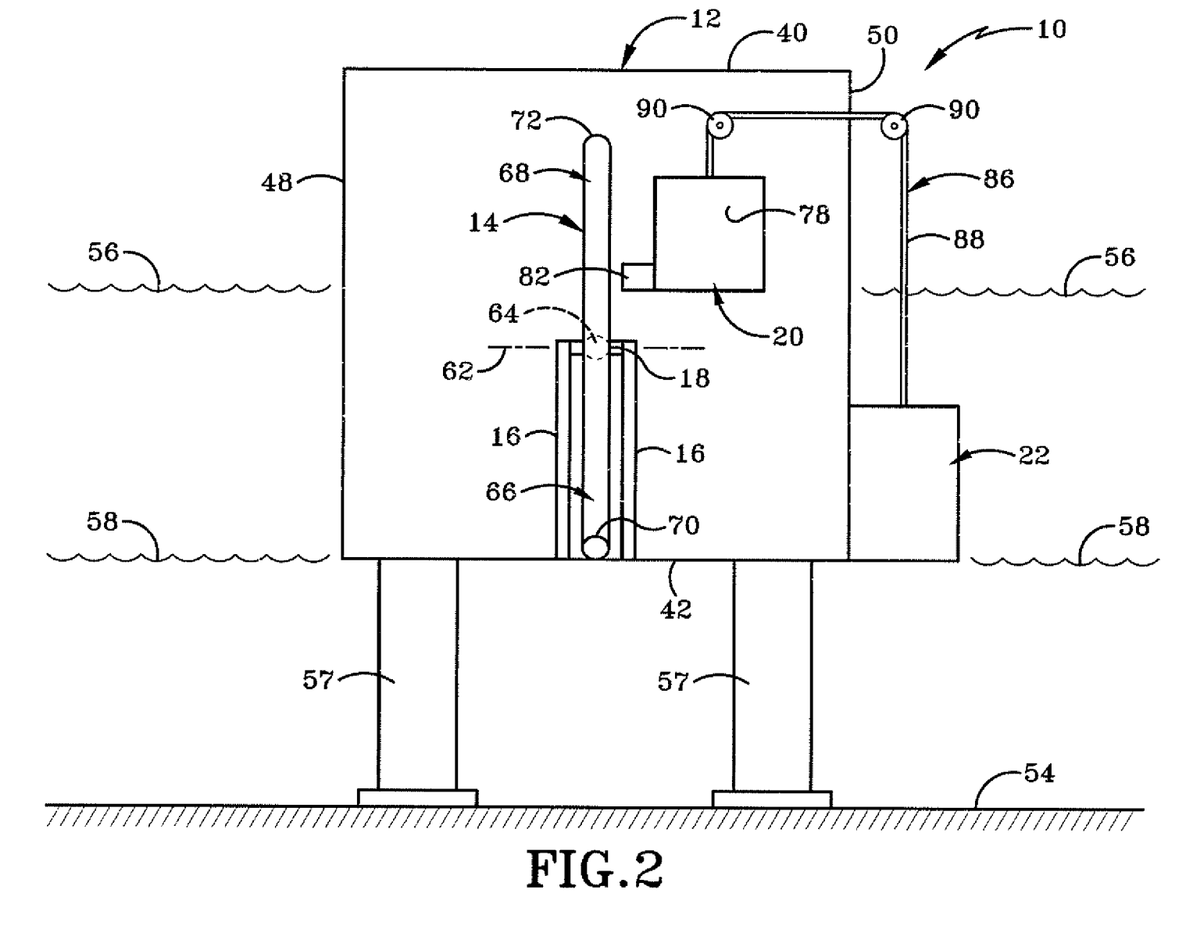
FIG. 2 (FIG. 2) is a side elevation view of the tidal energy converter taken along line 2-2 in FIG. 1.
Figure 3:
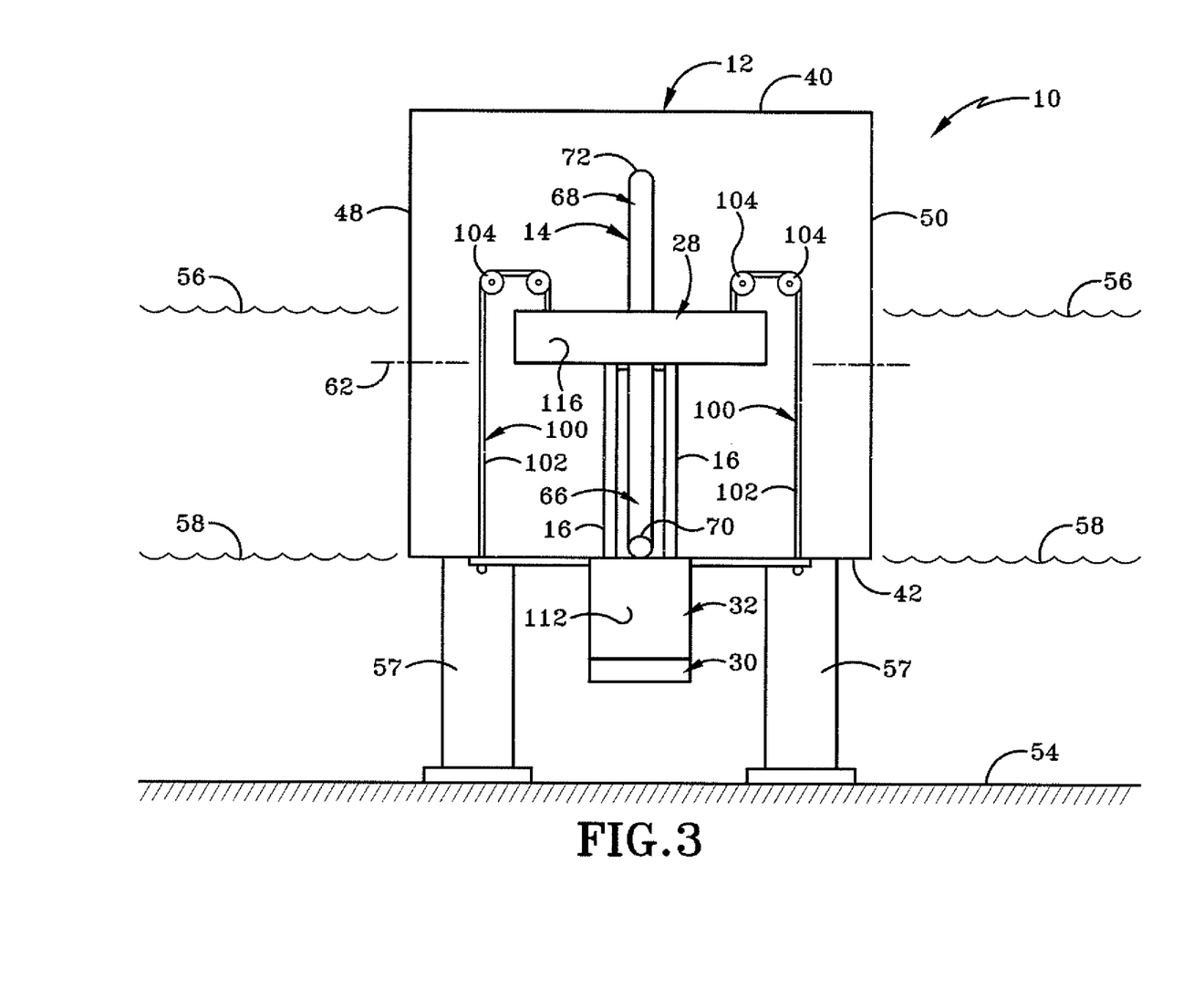
FIG. 3 (FIG. 3) is a section view of the tidal energy converter taken along line 3-3 in FIG. 1.

FIG. 1-FIG. 3 depict a tidal energy converter in accordance with one aspect of the present disclosure generally at 10. Tidal energy converter 10 may include a housing 12, a lever 14, a support 16 defining a fulcrum 18, an internal first feed tank 20, an external first ballast tank 22, an internal second feed tank 24, an external second ballast tank 26, an external third ballast tank 28, an external fourth ballast tank 30, an external first spill tank 32, an external fifth ballast tank 34, an external sixth ballast tank 36, and an external second spill tank 38.

FIG. 1 depicts housing 12 as a structure including a top wall 40, a bottom wall 42 defining a vertical direction therebetween. Housing 12 includes a first side 44 and a second side 46 defining a first transverse direction therebetween. Housing 12 includes a third side 48 (FIG. 2) and a fourth side 50 (FIG. 2) defining a second transverse direction therebetween that is perpendicular to the first transverse direction. Housing 12 defines an interior volume 52 within which certain components of the tidal energy converter 10 are disposed. In one particular embodiment, the housing 12 is mounted or secured to the floor 54 of a waterway or ocean. One exemplary manner in which the housing 12 may be mounted to floor 52 is through the use of supports 57 which rigidly couple the bottom wall 42 of housing 12 to floor 54. However, it is to be understood that other manners of securing housing 12 to the floor 54 of the waterway are entirely possible. As will be described in greater detail below, the waterway is an area that has a low tide and a high tide. The high tide watermark is represented by high tide level 56 and the low tide watermark is represented by low tide level 58. Housing 12 may be symmetrical about a vertical axis 60. In another exemplary embodiment, the housing may simply be a platform that is mounted in a waterway having a high tide level and a low tide level. In this respect, the platform may be any structure that is capable of supporting the ballast tanks, pulley systems, and lever. In some instances, the platform may be open to the environment such that the ballast tanks, pulley systems, and lever are not considered to be interior or inside the platform. The platform may simply have a planar major surface, similar to bottom wall 42 that supports the components from below and enables other structure to be built thereon to allow operation of the tidal energy converter 10 as described in greater detail herein.

In one particular embodiment, the support 16 is vertically elongated relative to the vertical axis 60. In this particular embodiment, the support 16 has a lower end that is rigidly coupled to the interior surface of the bottom wall 42, which extends upwardly to an upper end that defines the fulcrum 18. In other particular embodiments, the fulcrum 18 may be supported or defined by other structures. The fulcrum 18 is positioned vertically below the high tide level 56 and vertically above the low tide level 58. In one particular embodiment, the positioning of the fulcrum 18 is in a range from about ½ foot to about 3 feet below the high tide level 56. Fulcrum 18 defines a pivot axis 62, which is aligned parallel to the second transverse direction defined between the third side 48 and the fourth side 50 (see FIG. 2).

Lever 14 is operatively coupled with support 16 such that the lever pivots via the fulcrum 18 about the pivot axis 62. In one particular embodiment, lever 14 is a pipe that is sealed at its midline 64 (FIG. 2) that defines the pipe into a first segment 66 and a second segment 68. The pipe defining the lever 14 is not entirely hollow from end to end inasmuch as the midline seal 64 divides the pipe into first and second segments 66, 68. However, the pipe is hollow from its first end 70 to the midline seal 64, and is hollow from the second end 72 to the midline seal 64. Further, the seal 64 may be embodied as another structure or member that separates the lever into first and segments. For example, there could be two pipes that are separated from each other by a connector or spacer bar that is part of the lever. Referring back to the lever 14 being a pipe, and as will be described in greater detail herein, the internal diameter of the pipe may be sized depending on the amount of fluid moving therethrough. However, it is envisioned that an ordinary range for an internal diameter of the pipe defining the lever 14 may be in a range from about 6 inches to about 18 inches. Clearly the scale of the internal diameter of the pipe defining lever 14 may be increased or decreased depending on the application's specific needs of the tidal energy converter 10 that is to be employed based on the amount of energy to be generated, the details of which are described in greater detail herein. The longitudinal length of the pipe is less than the length of the housing 12 measured between the first side 44 and the second side 46, such that the pipe defining lever 14 fits entirely within the internal volume 52 of housing 12.

The internal first feed tank 20 and the internal second feed tank 24 are positioned within the interior volume 52 of the housing 12. First feed tank 20 may move vertically along a first vertical axis 74. The second feed tank 24 may move vertically along a second vertical axis 76. First vertical axis 74 and second vertical axis 76 are parallel to each other and aligned in the vertical direction. In one particular embodiment, the central vertical axis 60 is between the first axis 74 and the second axis 76. In one particular embodiment, the central vertical axis 60 is located directly between and in the middle of the parallel first and second vertical axes 74, 76. Each feed tank 20, 24 is configured to hold a volume of fluid within its internal volume. The first feed tank 20 has an internal volume 78 and the second feed tank 24 has an internal volume 80. In one particular embodiment, the internal volume 78 and the internal volume 80 of the feed tanks 20, 24 respectively, are equal. The first feed tank 20 has a discharge outlet 82 that is in fluid communication with the first segment 66 of the pipe defining the lever 14. The second feed tank 24 has a discharge outlet 84 that is in fluid communication with the second segment 68 of the pipe defining lever 14. The diameters and sizes of the discharge outlets 82, 84 may be sized by the application specific requirements in which fluid will discharge from the respective feed tanks 20, 24 to enter the respective sections 66, 68 of the pipe defining the lever 14.

The first feed tank 20 is in operative communication with the first ballast tank 22, which is positioned exterior to the housing 12. In one particular embodiment, the first ballast tank 22 is positioned exterior to the fourth side 50 of housing 12. The operative communication between the first feed tank 20 and the first ballast tank 22 may be accomplished in a number of different ways. However, it one particular embodiment, a pulley system may be utilized that connects the first feed tank 20 to the first ballast tank 22. In this instance, the pulley system 86 may include a cable 88 that is fixedly secured to the first feed tank 20 at a first end and fixedly secured to the first ballast tank 22 at a second end. At least one sheave 90 may alter the direction of the cable 88 such that when the feed tank moves vertically along the first axis 74, the first ballast tank 22 moves in an opposite direction relative the first axis 74. Stated otherwise, the pulley system 86 enables the first ballast tank 22 to move opposite the first feed tank 20 along the first vertical axis. For example, if the first feed tank 20 moves vertically downward along the first vertical axis 74, then the pulley system 86 enables the ballast tank 22 to move vertically upward relative to the first vertical axis 74.

Similar to the arrangement between the first feed tank 20 and the first spill tank 22, a pulley similar to that which was previously described can be utilized to connect the second feed tank 24 to the second ballast tank 26. In this instance, the second feed tank 24 is positioned internally within the internal volume 52 of housing 12 and the second ballast tank 26 is positioned exterior to the fourth side 54 of housing 12. The pulley system that operatively connects the second feed tank 24 with the second ballast tank 26 operates in a similar manner to that which was described above, such that when the second feed tank 24 moves vertically along the second axis 76, the second ballast tank 26 moves in opposite direction relative to the second feed tank 24. For example, if the second feed tank 24 moves vertically upward along the second axis 76, then the second ballast tank 26 would move vertically downward relative to the second axis 76.

The first and second ballast tanks 22, 26 have a larger interior volume than that of the first and second feed tanks 20, 24. More particularly, the interior volume 92 of the first ballast tank 22 holds a greater volume of fluid than the interior volume 78 of the first feed tank 20. An interior volume 94 of the second ballast tank 26 is greater than the interior volume 80 of the second feed tank 24. As such, when the first ballast tank 22 is full of fluid, the greater volume 92 filled with fluid is able to lift or raise the first feed tank 20, via gravity, along the first axis 74. Similarly, the second ballast tank 26 having a larger interior volume 94 is able to raise the second feed tank 24, via gravity, having a smaller interior volume 80.

The third ballast tank 28, the fourth ballast tank 30, and the spill tank 32 are positioned exterior of the housing 12 outside of the first wall 44. The third ballast tank 28 is configured to move vertically along vertical axis 96. Fifth ballast tank 34, the sixth ballast tank 36, and the second spill tank 38 are exterior the housing 12 exterior to second wall 46. Fifth ballast tank 34 is configured to move vertically along vertical axis 98. Vertical axis 96 and vertical axis 98 are parallel with each other and parallel with the central vertical axis 60.

Third ballast tank 28 is operatively connected with the fourth ballast tank 30 and the first spill tank 32 via a pulley system 100, including at least one cable 102 and at least one sheave 104. The pulley system 100 operates in a manner such that when the third ballast tank 28 moves along axis 96 in a first vertical direction, the fourth ballast tank 30 and the spill tank 32 move along the vertical axis 96 in an opposite second direction. For example, when the third ballast tank 28 moves vertically upward along axis 96, the fourth ballast tank 30 and the first spill tank 32 move vertically downward along axis 96.

Similarly, fifth ballast tank 34 is operatively connected to the sixth ballast tank 36 and the second spill tank 38 via a pulley system 106, including at least one cable 108 and at least one sheave 110. In a similar manner, pulley system 106 enables the fifth ballast tank 34 to move along vertical axis 98 in an opposite direction of the sixth ballast tank 36 and the second spill tank 38.

The first spill tank 32 is rigidly secured to the fourth ballast tank 30. In one particular embodiment, the fourth ballast tank 30 is positioned below the spill tank 32. The spill tank 32 defines an interior volume 112 that is sized greater than or equal to the interior volume 78 of the first feed tank 20. First spill tank 32 is in fluid communication with the first segment 66 of the pipe defining the lever 14 such that fluid moving from the discharge outlet 82 of the first feed tank 20 may flow through the first segment 66 of the pipe defining the lever 14 and outwardly through the first end 70 into the spill tank 32. Similarly, the second spill tank 38 defines an interior volume 114 that is greater than or equal to the interior volume 80 of the second feed tank 24. Fluid flowing outwardly from the discharge outlet 84 from the second feed tank 24 into the second section 68 of the pipe defining the lever 14 may flow outwardly through the second end 72 into the second spill tank 38, the operation of which is described in greater detail herein.

FIG. 3 depicts that the third ballast tank 28 has an interior volume 116 that is larger than the first spill tank 32 and the fourth ballast tank 30. The fifth ballast tank 34 is sized similarly to the third ballast tank 28 and is larger than the sixth ballast tank 36, which is rigidly connected below the second spill tank 38.

Having thus described the structural configuration of the tidal energy converter 10, reference will be made to its operation and how it utilizes rising and falling tides between the high tide level 56 and the low tide level 58 to generate energy through the use of moving fluid that is easily repeated and cyclical in nature each time the tide rises and falls.

In operation and with reference to FIG. 1-3, with respect to the pivoting movement of the lever 14, one end of the lever would begin in an elevated position. For this example, assume that the first section 66 and the first end 70 of the lever 14 begins in its raised or highest elevation position. The first feed tank 20, having been filled with fluid (such as seawater) when the fluid was at the high tide level 56, will begin to discharge fluid from its discharge outlet 82 in fluid communication with the first segment 66 of the pipe defining the lever 14. The discharge rate of the fluid from outlet 82 will depend on the diameter or area of the outlet opening. Typically, the size of the opening will be set by the operator depending on the desired discharge rate. Some exemplary discharge rates would result in the first feed tank 20 discharging its fluid in a range from about 1 to 6 hours. Thus, depending on the volume 78 of tank 20, the outlet 82 would be sized to ensure the discharge rate is within the desired range.

Fluid will discharge through outlet 82 and begin to enter the first segment 66 of the pipe and flow downwardly, due to gravity, towards the vertical axis 60 (when the first end 70 is raised). Fluid will be blocked by the midline seal 64 and begin accumulating within the interior volume or bore of the pipe defining the lever 14. Once a sufficient amount of fluid begins to fill the pipe between the midline seal 64 and the discharge outlet 82, the lever 14 will begin to pivot downwardly in the direction of arrow A about the fulcrum and about the pivot axis 62. In alternative embodiment, the portion of the segment 66 may be coupled with another tank to increase the storage volume of fluid flowing through outlet 82 to increase its weight which will assist in moving the lever relative to the fulcrum. The fluid will weigh the lever down such that it descends towards and beyond the equilibrium point, which is coplanar with the pivot axis 62. The lever may be connected with an electrical generator that generates electricity in response to mechanical movement. Thus, as described herein, movement of the lever 14 can multiply force and generate electricity when connected to an appropriate generator. In some instances, the fluid discharging through outlet 82 will be at least 80,000 gallons which should equate to about one megawatt of potential energy.

Once the first segment 66 of the pipe defining the lever 14 passes below the equilibrium plane defined by the pivot axis 62 due to the weight of the fluid within the pipe, a portion (%) will flow out of the first end 70 of the pipe into the spill tank 32.

Once the first tank has discharged its portion (%) fluid, the second tank 24 may begin to discharge its portion (%) fluid (which may have been filled with seawater at the previous high tide level 56). In a mirrored manner to the first section 66 of pipe, the second section 68 will fill with fluid from the volume 80 from the second tank 24. Fluid will flow from the outlet 84 towards the midline seal 64. Once a sufficient amount of fluid begins to fill the pipe between the midline seal 64 and the discharge outlet 84, the lever 14 will begin to pivot downwardly about the fulcrum and about the pivot axis 62. The fluid will weigh the lever down such that it descends towards and beyond the equilibrium point, which is coplanar with the pivot axis 62. The lever may be connected with an electrical generator that generates electricity in response to mechanical movement. Thus, as described herein, movement of the lever 14 can generate electricity when connected to an appropriate generator. Both levers will alternate multiplying rotary torque.

Once the second segment 68 of the pipe defining the lever 14 passes below the equilibrium plane defined by the pivot axis 62 due to the weight of the fluid within the pipe, a portion (%) will flow out of the second end 72 of the pipe into the spill tank 38.

During the discharge process of both feed tanks, the tide will fall from the high tide level 56 to the low tide level. Once both feed tanks 20 and 24 have discharged their fluid over a time range of 6 hours, the converter 10 may remain idle until the tide again rises from the low tide level back up to the high tide level.

In operation and with reference to FIG. 2, the first feed tank 20 and the first ballast tank 22 begin their operation as the tide rises from the low tide level 58 to the high tide level 56. As the tide rises, the exterior ballast tank 22 buoys upwardly to an uppermost position. This causes the interior feed tank to descend. Once the high tide level 56 is reached by the water, both the interior feed tank 20 and the exterior ballast tank 22 fill with sea water or fluid. As the tanks are filled, the exterior ballast tank 22 will descend and this will cause the interior feed tank 20 to rise or ascend. In one embodiment, the pulley system 86 is arranged such that the vertical distance that the feed tank 20 ascends will equal the distance that the ballast tank 22 descends. However, the pulley system 86 can be altered such that the distance that the tank 20 ascends is different than the distance that the ballast tank 22 descends. Then, the interior feed tank 20 will be in its raised position so that its fluid can be discharged out of its discharge outlet 82 through the first segment of the pipe. When the tide begins to fall from the high tide level 56 to the low tide level 58, the first ballast tank 22 will being to empty its contents at the low tide level 58 in preparation of repeating the cycle so that it may buoy upwardly up to the high tide level 56 to repeat the cycle.

In operation and with reference to FIG. 3, the spill tank 32 and the external ballast tank 28 begin its operation at the high tide level 56. The exterior ballast tank 28 fills up with fluid, such as seawater, at the high tide level. The spill tank level is emptied to receive the spill volume from the fluid moving from the first feed tank 20 through the first segment 66 and outwardly through the first end 70 of the pipe. The ballast tank 30 connected to the spill tank 32 always remains filled to keep the spill tank below the low tide level 58. At the low tide level 58, the exterior ballast tank 28 descends. This raises the spill tank 32 above the low tide level 58. When the spill tank 32 rises above the low tide level, the contents of its tank are emptied. When the tide raises to the high tide level 56, the exterior ballast tank 28 buoys upwardly and the spill tank 32 submerges to repeat the cycle.

A similar process is repeated on the other side of the tidal energy converter 10 opposite the vertical axis 60. Similar to the operational description referenced to the first feed tank 20, the first spill tank 32, and the ballast tanks 22, 28, a similar cyclical fluid movement occurs with respect to the second feed tank 24 and the second spill tank 38, and the ballast tanks 26 and 34.

According to one exemplary embodiment, the platform may have the following exemplary dimensions. The length of the platform measured from the first end to the second end may be about 14 meters. The width of the platform measured from the first side to the second side may be about 9 meters. The height of the platform measured from the top to the bottom may be about 9 meters. Thus, the internal volume of the platform may be approximately 1134 meters cubed.

The first feed tank and the second feed tank may be similar in size. In one particular embodiment, the first feed tank and the second feed tank have the dimensions of a length of about 6 meters, a height of about 0.5 meters, and a width of about 3 meters. This means that the internal volume of the first feed tank and the second feed tank is approximately 18 cubic meters. When filled with sea water, this approximates about 18,000 kilograms of sea water. In multiplying the potential energy to establish a force, the 18,000 kilograms is multiplied by gravity (9.81 meters per second squared). This results in a potential energy of about 176,400 Newton meter or 176400 Joules.

In another particular embodiment, the overall length of the lever is 12 meters. Thus the length of the first segment is about 6 meters and the length of the second segment is also about 6 meters. The height of the fulcrum is about 1.22 meters above the bottom surface of the platform. Along one segment of the lever, the system may constrain the lever to have a maximum lever arm or moment arm of 5 meters. In another particular embodiment, the moment arm or lever arm may be approximately 80 percent that of the length of the first segment. In this scenario where the moment arm or lever arm is at 5 meters, the torque at the maximum lever arm of 5 meters is approximately 882,000 newton meters.

The discharge outlet of the first feed tank may be positioned and operatively connected at various points along the length of the first segment of the lever depending on the amount of force to be generated through torque during movement of the lever. At one particular embodiment, the discharge outlet may be operatively connected to the lever at a distance of approximately 0.5 meters from the fulcrum. This would constitute the minimum distance away from the fulcrum. The maximum distance away from the fulcrum that the discharge outlet could be located would be about 5 meters from the fulcrum when the first segment is 6 meters total. As discussed above, torque is at its maximum when the discharge outlet is connected at its maximum distance to establish a moment arm that is as far away from the fulcrum as possible. Discharge valves depend on height of tide.

One exemplary manner in which the lever is able to generate electricity is by connecting the lever to an air source. Movement of the lever as it pivots about the fulcrum can compress the air source. The compressed air in a compressed air storage tank 25 can be used to drive a compressed air electricity generator 27. The compressed air generator will run through ordinary operation as one having ordinary skill in the art would understand with respect to powering an electrical generator with compressed air. When the lever 14 compresses air in the compressed air storage tank 25, the compressed air can power the generator 27 that is able to generate approximately 147 kilowatts. Thus, approximately seven machines (i.e., fourteen of converter 10) will generate approximately one megawatt of energy.

The third ballast tank 28, according to one exemplary embodiment, has a length of about 7 meters, a width of about 7 meters, and a height of about 0.5 meters. Thus, the internal volume of the third ballast tank 28 is about 24.5 meters cubed. The external first spill tank 32 has a volume that is similar to the first feed tank 20 or is slightly larger than first feed tank 20. In one example, the first spill tank 32 has a length of about 6 meters, a width of about 3 meters, and a height of about 0.5 meters. Thus, the volume of the external first spill tank 32 is slightly larger than the first feed tank 20, which in this example had a length of about 6 meters, a height of about 0.5 meters, and a width of about 3 meters.

The external first ballast tank 22 has an exemplary dimension of a length of about 7.5 meters, a width of about 3 meters, and a height of about 0.5 meters. Thus the internal volume of the external first ballast tank 22 is about 11.25 meters cubed. Thus, the external first ballast tank 22 may have a larger volume than the first feed tank 20 to which it is connected via the pulley system or other operational connection.

Figure 4:
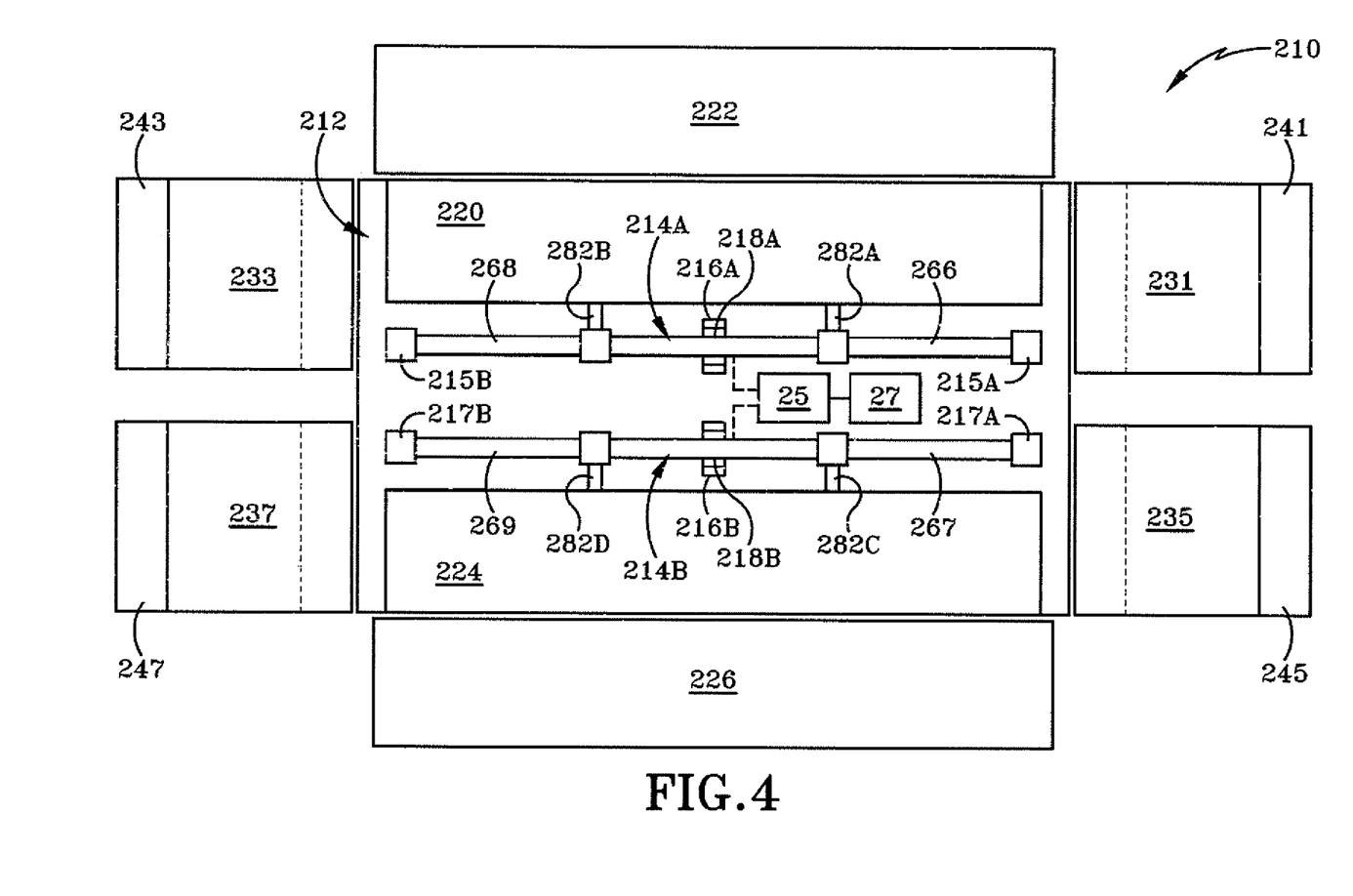
FIG. 4 (FIG. 4) is a top plan view of a second embodiment of a tidal energy converter.

FIG. 4 depicts another alternative embodiment of a tidal energy converter generally at 210. Tidal energy converter 210 includes a platform 212 or housing 212 with a variety of tanks connected thereto and a plurality of levers that are used to continuously cycle over a 24 hour period or another period commensurate with movement of tides. Similar to the first embodiment, the platform or housing 212 is configured to be installed within a waterway having a high tide level and a low tide level.

Tidal energy converter 210 may include a first lever 214A and second lever 214B. First lever 214A is connected to a first support 216A defining a first fulcrum 218A. The second lever 214B is connected to a second support 216B defining a second fulcrum 218B. There is an internal first feed tank 220 in fluid communication with the first lever 214A and an internal second feed tank 224 in fluid communication with the second lever 214B. The first feed tank 220 is in operative communication with an external first ballast tank 222 and the second feed tank 224 is in operative communication with an external second ballast tank 226.

Exterior the platform or housing 212 are at least four spill tanks. Namely, a first spill tank 231 and a second spill tank 233 are in fluid communication with the first lever 214A. Particularly, a first end 215A of the first lever 214A is in fluid communication with the first spill tank 231. A second end 215B of the first lever 214A is in fluid communication with the second spill tank 233. A third spill tank 235 and a fourth spill tank 237 are in fluid communication with the second lever 214B. Particularly, a first end 217A of the second lever 214B is in fluid communication with the first spill tank 235 and a second end 217B of the second lever 214B is in fluid communication with the fourth spill tank 237.

Each spill tank 231, 233, 235, and 237 may have a connected ballast tank positioned therebelow. Namely, a ballast tank 241 may be connected to the first spill tank 231. A ballast tank 243 may be connected to the second spill tank 233. A ballast tank 245 may be connected to the third spill tank 235. A ballast tank 247 may be connected to the fourth spill tank 237.

While the dimensions of each of the components of the alternative embodiment title energy converter 210 are not intended to be limiting, some exemplary dimensions are provided below.

Platform 212 may have a length of about 14 meters and a width of about 9 meters. If the platform 212 is simply a platform, there may not be any upwardly extending vertical sidewalls. However, if platform 212 is an enclosed housing, then the vertical height of the platform would enclose an internal volume housing the first feed tank 220, the first lever 214A, the second feed tank 224, and the second lever 214B. Within the "footprint" of the platform 212 is the first feed tank 220 having a length of about 13 meters and a width of about 3 meters. In one particular embodiment, the vertical height of the first feed tank 220 may be about 0.5 meters to produce an overall internal volume of the first feed tank 220 of approximately 18 meters cubed. The second feed tank 224 is also within the "footprint" of the platform 212 having similar dimensions as the first feed tank 220.

Each of the spill tanks 231, 233, 235, and 237 have similar dimensions. In one embodiment, each spill tank 231, 233, 235, and 237 has a length of about 7 meters, a width of about 3 meters, and a height of about 0.5 meters resulting in a holding volume of about 10.5 meters cubed. In this embodiment, for the tidal energy converter 210, each of the two spill tanks associated with each lever are individually smaller than the feed tank connected to the same lever.

Stated otherwise, first feed tank 220 has a first outlet 282A and a second discharge outlet 282B. First outlet 282A is in fluid communication with a first segment 266 on the first lever 214A and the second outlet 282B is in fluid communication with a second segment 268 of the first lever 214A.

The second feed tank 224 includes a first discharge outlet 282C and a second discharge outlet 282D. The first discharge outlet 282C is in fluid communication with a first segment 267 of the second lever 214B and the second discharge outlet 282D is in fluid communication with a second segment 269 of the second lever 214B.

The first feed tank 220 is in operative communication with the first ballast tank 222, which is positioned exterior of the housing or platform 212. In one particular embodiment, the first ballast tank 222 is positioned exterior to a side of the housing. The operative communication between the first feed tank 220 and the first ballast tank 222 may be accomplished in a number of different ways. However, in one particular embodiment, a pulley system may be utilized that connects the first feed tank 220 to the first ballast tank 222. While not shown in FIG. 4, the pulley system that may be utilized may include a cable that is fixedly secured to the first feed tank 220 at a first end and fixedly secured to the first ballast tank 222 at a second end. There may be one sheave that may alter the direction of the cable such that when the feed tank 220 moves vertically along a vertical axis, the first ballast tank 220 moves in an opposite direction relative to that vertical axis. Stated otherwise, the pulley system enables the first ballast tank 222 to move opposite the first feed tank 220 along a vertical axis. For example, if the first feed tank 220 moves vertically downward along a vertical axis, then the pulley system enables the first ballast tank 222 to move vertically upward relative to a vertical axis. Similar to the arrangement between the first feed tank 220 and the first ballast tank 222, the second feed tank 224 may be connected via a similar but different pulley system to provide an operative communication between the second feed tank 224 and the second ballast tank 226. Similar to the description above, there may be a cable connecting the operative communication between the second feed tank 224 and the second ballast tank 226 such that when the second feed tank 224 moves vertically downward along a vertical axis, the second ballast tank moves vertically upward along another vertical axis offset parallel to the second feed tank 224.

In operation and with reference to FIG. 4, the feed tanks 220, 224 are filled when the platform, which is mounted in a waterway, is at a high tide level. With respect to the pivoting movement of the levers 214A, 214B, one end of the first lever 214A would begin in an elevated position. For this example, assume that the first section 266 and the first end (defined by first outlet 215A) of the lever 214A begins in its raised or highest elevation position. The first feed tank 220, having been filled with fluid (such as seawater) when the fluid was at the high tide level 56, will begin to discharge fluid from its discharge first outlet 282A in fluid communication with the first segment 266 of the pipe defining the lever 214A. The discharge rate of the fluid from outlet 282A will depend on the diameter or area of the outlet opening. Typically, the size of the opening will be set by the operator depending on the desired discharge rate. Some exemplary discharge rates would result in the first feed tank 220 discharging its fluid in a range from about 1 to 6 hours. Thus, depending on the volume of tank 220, the outlet 282A would be sized to ensure the discharge rate is within the desired range.

Fluid will discharge through outlet 282A and begin to enter the first segment 266 of the pipe and flow downwardly, due to gravity, towards the vertical axis defined by support 216A (when the first end (defined by outlet 215A) is raised). Fluid will be blocked by a midline seal and begin accumulating within the interior volume or bore of the pipe defining the lever 214A. Once a sufficient amount of fluid begins to fill the pipe between the midline seal and the discharge outlet 282A, the lever 214A will begin to pivot downwardly about the fulcrum 218A and about a pivot axis. In an alternative embodiment, the portion of the segment 266 may be coupled with another tank to increase the storage volume of fluid flowing through outlet 2A82 to increase its weight which will assist in moving the lever 214A relative to the fulcrum 218A. The fluid will weigh the lever down such that it descends towards and beyond the equilibrium point, which is coplanar with the pivot axis 62. The lever may be indirectly coupled with an electrical generator that generates electricity in response to mechanical movement. More particularly, lever 214A is connected to a compressed air tank to compress air in response to pivoting action of the lever. The compressive force compresses air in the tank which generates a sufficient amount of compressed air pressure to power a compressed air electrical generator. Thus, as described herein, movement of the lever 14 can multiply force and generate compressed air that is used to power an electrical generator that generates electricity. In some instances, the fluid discharging through outlet 282A will be at least 80,000 gallons which should equate to about one megawatt of potential energy.

Once the first segment 266 of the pipe defining the lever 214A passes below the equilibrium plane defined by the pivot axis due to the weight of the fluid within the pipe, a portion of the fluid will flow to the first end outlet 215A and discharge into the spill tank 231.

Once the first tank has discharged a portion of its fluid, the first outlet 282A will close. The second outlet 282B will then open. The first tank 220 may begin to discharge a second portion of its fluid (which may have been filled with seawater at the previous high tide level 56). In a mirrored manner to the first section 266 of pipe, the second section 268 will fill with fluid from the volume from the first tank 220. Fluid will flow from the outlet 282B towards the midline seal 64. Once a sufficient amount of fluid begins to fill the pipe between the midline seal and the discharge outlet 282B, the lever 214A will begin to pivot downwardly about the fulcrum 218A and about the pivot axis. The fluid will weigh the lever down such that it descends towards and beyond the equilibrium point, which is coplanar with the pivot axis 62. The lever 214A is indirectly coupled with an electrical generator that generates electricity in response to mechanical movement of the lever via the compressed air tank that drives the electrical generator. Thus, as described herein, movement of the lever 14 can generate electricity when connected to an appropriate generator. The rate at which fluid discharges from the second outlet 282B will last from about 1 hour to about 6 hours.

Once the second segment 268 of the pipe defining the lever 214A passes below the equilibrium plane defined by the pivot axis due to the weight of the fluid within the pipe, a portion of the fluid will flow to the second end outlet 215B and discharge into the spill tank 233.

During the discharge process of feed tank 220, the tide will fall from the high tide level 56 to the low tide level. Once feed tank 220 has discharged its fluid over a time range of about up to 6 hours, the converter 210 may switch to operate the second lever 214B over the next sequential 6-hour period such that converter 210 is able to operate continuously over a 24-hour period.

With respect to the next sequential operation of converter 210, one end of the second lever 214B would begin in an elevated position. For this example, assume that the first section 267 and the first end (defined by first outlet 217A) of the lever 214B begins in its raised or highest elevation position. The second feed tank 224, having been filled with fluid (such as seawater) when the fluid was at the high tide level 56, will begin to discharge fluid from its discharge first outlet 282C in fluid communication with the first segment 267 of the pipe defining the lever 214B. The discharge rate of the fluid from outlet 282C will depend on the diameter or area of the outlet opening. Typically, the size of the opening will be set by the operator depending on the desired discharge rate. Some exemplary discharge rates would result in the first feed tank 224 discharging its fluid in a range from about 1 to 6 hours. Thus, depending on the volume of tank 224, the outlet 282C would be sized to ensure the discharge rate is within the desired range.

Fluid will discharge through outlet 282O and begin to enter the first segment 267 of the pipe and flow downwardly, due to gravity, towards the vertical axis defined by support 216B (when the first end (defined by outlet 217A) is raised). Fluid will be blocked by a midline seal and begin accumulating within the interior volume or bore of the pipe defining the lever 214B. Once a sufficient amount of fluid begins to fill the pipe between the midline seal and the discharge outlet 282C, the lever 214B will begin to pivot downwardly about the fulcrum 218B and about a pivot axis. In an alternative embodiment, the portion of the segment 267 may be coupled with another tank to increase the storage volume of fluid flowing through outlet 282C to increase its weight which will assist in moving the lever 214B relative to the fulcrum 218B. The fluid will weigh the lever down such that it descends towards and beyond the equilibrium point, which is coplanar with the pivot axis. The lever 214B may be indirectly coupled with an electrical generator that generates electricity in response to mechanical movement. More particularly, lever 214B is connected to a compressed air tank to compress air in response to pivoting action of the lever. The compressive force compresses air in the tank which generates a sufficient amount of compressed air pressure to power a compressed air electrical generator. Thus, as described herein, movement of the lever 214B can multiply force and generate compressed air that is used to power an electrical generator that generates electricity. In some instances, the fluid discharging through outlet 282C will be at least 80,000 gallons which should equate to about one megawatt of potential energy.

Once the first segment 267 of the pipe defining the lever 214B passes below the equilibrium plane defined by the pivot axis due to the weight of the fluid within the pipe, a portion of will flow to the first end outlet 217A and discharge into the spill tank 235.

Once the first tank has discharged a portion of its fluid, the first outlet 282C will close. The second outlet 282D will then open. The second feed tank 224 may begin to discharge a second portion of its fluid (which may have been filled with seawater at the previous high tide level 56). In a mirrored manner to the first section 267 of pipe, the second section 269 will fill with fluid from the volume from the second tank 224. Fluid will flow from the outlet 282D towards the midline seal. Once a sufficient amount of fluid begins to fill the pipe between the midline seal and the discharge outlet 282D, the lever 2148 will begin to pivot downwardly about the fulcrum 218B and about the pivot axis. The fluid will weigh the lever 214B down such that it descends towards and beyond the equilibrium point, which is coplanar with the pivot axis. The lever 214B is indirectly coupled with an electrical generator that generates electricity in response to mechanical movement of the lever via the compressed air tank that drives the electrical generator. Thus, as described herein, movement of the lever 214B can generate electricity when connected to an appropriate generator. The rate at which fluid discharges from the second outlet 282D will last from about 1 hour to about 6 hours.

Once the second segment 269 of the pipe defining the lever 214B passes below the equilibrium plane defined by the pivot axis due to the weight of the fluid within the pipe, a portion will flow to the second end outlet 2178 and discharge into the spill tank 237.

In operation and with reference continued reference to converter 210, the first feed tank 220 and the first ballast tank 222 begin their operation as the tide rises from the low tide level 58 to the high tide level 56. As the tide rises, the exterior ballast tank 222 buoys upwardly to an uppermost position. This causes the interior feed tank 220 to descend. Once the high tide level 56 is reached by the water, both the interior feed tank 220 and the exterior ballast tank 222 fill with sea water or fluid. As the tanks are filled, the exterior ballast tank 222 will descend and this will cause the interior feed tank 220 to rise or ascend. In one embodiment, a pulley system (or other mechanical system) is arranged such that the vertical distance that the feed tank 220 ascends will equal the distance that the ballast tank 222 descends. However, the pulley system or mechanical system can be altered such that the distance that the tank 220 ascends is different than the distance that the ballast tank 222 descends. Then, the interior feed tank 220 will be in its raised position so that its fluid can be discharged out of its discharge outlets 282A, 282*b* through the first and segment of the pipe defining lever 214A, respectively. When the tide begins to fall from the high tide level 56 to the low tide level 58, the first ballast tank 222 will begin to empty its contents at the low tide level 58 in preparation of repeating the cycle so that it may buoy upwardly up to the high tide level 56 to repeat the cycle.

Similarly, the second feed tank 224 and the second ballast tank 226 begin their operation as the tide rises from the low tide level 58 to the high tide level 56. As the tide rises, the exterior ballast tank 226 buoys upwardly to an uppermost position. This causes the interior feed tank 224 to descend. Once the high tide level 56 is reached by the water, both the interior feed tank 224 and the exterior ballast tank 226 fill with sea water or fluid. As the tanks are filled, the exterior ballast tank 226 will descend and this will cause the interior feed tank 224 to rise or ascend. In one embodiment, a pulley system (or other mechanical system) is arranged such that the vertical distance that the feed tank 224 ascends will equal the distance that the ballast tank 226 descends. However, the pulley system or mechanical system can be altered such that the distance that the tank 224 ascends is different than the distance that the ballast tank 226 descends. Then, the interior feed tank 224 will be in its raised position so that its fluid can be discharged out of its discharge outlets 282C, 282D through the first and segment of the pipe defining lever 214B, respectively. When the tide begins to fall from the high tide level 56 to the low tide level 58, the second ballast tank 226 will begin to empty its contents at the low tide level 58 in preparation of repeating the cycle so that it may buoy upwardly up to the high tide level 56 to repeat the cycle.

In operation and with continued reference to converter 210, the spill tanks 231, 233 and external ballast tanks coupled to spill tanks 231, 233 begin its operation at the high tide level 56. The exterior ballast tanks linked to spill tanks 231, 233 fills up with fluid, such as seawater, at the high tide level. The spill tanks 231, 233 have been emptied to receive the spill volume from the fluid moving from the first feed tank 220 through the first segment 266 and the second segment 268 outwardly through the respective ends of the lever 214A. The ballast tank 241 connected to the spill tank 231 always remains filled to keep the spill tank 231 below the low tide level 58, and the ballast tank 243 always remains filled to keep the spill tank 233 below the low tide level. At the low tide level 58, the exterior ballast tank linked to the spill tank 231 descends. Similarly, at the low tide level, the exterior ballast tank linked to the spill tank 233 descends. The descending action of the exterior ballast tanks cause the spill tank 231 and spill tank 233 to raise above the low tide level 58. When the spill tanks 231, 233 rises above the low tide level, the contents of those tanks are emptied. When the tide raises to the high tide level 56, the exterior ballast tanks buoy upwardly and the spill tanks 231, 233 submerges to repeat the cycle.

A similar process is repeated on the other side of the tidal energy converter 210. Namely, the spill tanks 235, 237 and external ballast tanks coupled to spill tanks 235, 237 begin its operation at the high tide level 56. The exterior ballast tanks linked to spill tanks 235, 237 fills up with fluid, such as seawater, at the high tide level. The spill tanks 235, 237 have been emptied to receive the spill volume from the fluid moving from the second feed tank 224 through the first segment 267 and the second segment 269 outwardly through the respective ends of the lever 214B. The ballast tank 245 connected to the spill tank 235 always remains filled to keep the spill tank 235 below the low tide level 58, and the ballast tank 247 always remains filled to keep the spill tank 237 below the low tide level. At the low tide level 58, the exterior ballast tank linked to the spill tank 235 descends. Similarly, at the low tide level, the exterior ballast tank linked to the spill tank 237 descends. The descending action of the exterior ballast tanks cause the spill tank 235 and spill tank 237 to raise above the low tide level 58. When the spill tanks 235, 237 rises above the low tide level, the contents of those tanks are emptied. When the tide raises to the high tide level 56, the exterior ballast tanks buoy upwardly and the spill tanks 235, 237 submerges to repeat the cycle.

As understood by one having ordinary skill in the art, the electrical generators coupled to converter 10 could be coupled to an electrical power grid or an electrical storage system, such as a battery bank. The generated energy may be fed to a downstream destination to be used or consumed by subscribers to the power grid to power their electrical needs. This electrical power may supplement or may be used in lieu of energy on the power grid generated from fossil fuel sources.

Figure 5:
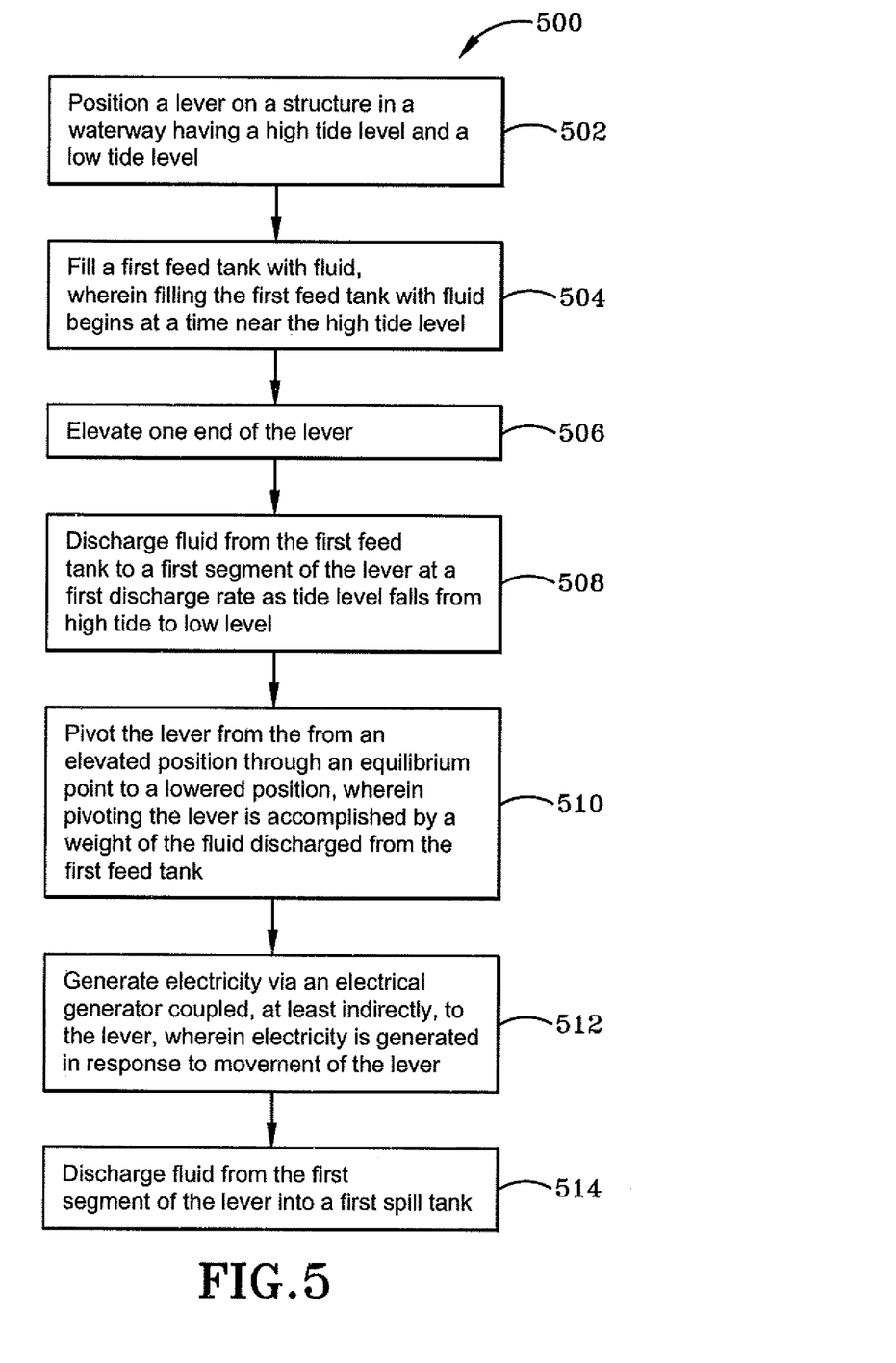
FIG. 5 (FIG. 5) is a flow diagram showing an exemplary method of operation of a tidal energy converter.

FIG. 5 depicts an exemplary method of operation generally at 500. Method 500 includes positioning a lever on a structure in a waterway having a high tide level and a low tide level, which is shown generally at 502. Method 500 includes filling a first feed tank with fluid, wherein filling the first feed tank with fluid begins at a time near the high tide level, which is shown generally at 504. Method 500 includes elevating one end of the lever, which is shown generally at 506. Method 500 includes discharging fluid from the first feed tank to a first segment of the lever at a first discharge rate as tide level falls from high tide to low level, which is shown generally at 508. Method 500 includes pivoting the lever from the from an elevated position through an equilibrium point to a lowered position, wherein pivoting the lever is accomplished by a weight of the fluid discharged from the first feed tank, which is shown generally at 510. Method 500 includes generating electricity via an electrical generator coupled, at least indirectly, to the lever, wherein electricity is generated in response to movement of the lever, which is shown generally at 512. Method 500 includes discharging fluid from the first segment of the lever into a first spill tank, which is shown generally at 514.

In addition to the foregoing, method 500 may further include elevating an opposite end of the lever; discharging fluid from one of (i) a second feed tank and (ii) the first feed tank to a second segment of the lever as tide levels change; wherein the second feed tank and the first feed tank was filled with fluid that began at the time near the high tide level; pivoting the opposite end of the lever from the from an elevated position through the equilibrium point to a lowered position, wherein pivoting the lever is accomplished by a weight of the fluid discharged from the second feed tank; discharging fluid from the second segment of the lever into a second spill tank; and generating electricity from the fluid discharged from the second segment of the lever. In an exemplary embodiment of method 500 discharging fluid form the first feed tank at the first discharge rate is accomplished in a range from about 1 hour to about 6 hours.

In another embodiment of method 500, the method may further include buoying upwardly a first ballast tank operatively connected with the first feed tank thereby causing the first feed tank to descend; after filling the first feed tank with fluid, descending the first ballast tank thereby causing the first feed tank to ascend; filling the third ballast tank at the time near the high tide level; descending the third ballast tank to thereby raise the first spill tank above the low tide level; and emptying the first spill tank when the first spill tank raises above the low tide level.

In an alternative operation, there may be an external ballast tank that can be filled with air or another fluid having a different viscosity than the sea water. The external ballast tank can be coupled to a moveable lever. In this instance, the lever can be considered a lever that pivots or a lever that translates along an axis, like a ram piston or a hydraulic piston/cylinder. The external ballast tank may buoy upwardly and downwardly exterior to the platform as the tide rises and falls. The buoy movement of the exterior ballast tank may be hydraulically connected or linked to the lever that moves. The movement of the ballast tank can be utilized to compress air from an air source to create a stored amount of compressed air. Thereafter, the compressed air can be used to power an electrical generator.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately"

may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A tidal energy converter comprising:
   a platform adapted to be mounted in a waterway that has a high tide level and a low tide level;
   a lever on the platform that pivots about a fulcrum, wherein the fulcrum is vertically below the high tide level;
   a first feed tank having a first discharge outlet in fluid communication with the lever
   a pivot axis defined by the fulcrum, wherein the lever pivots about the pivot axis;
   a first segment of the lever on one side of the fulcrum; and
   a second segment of the lever on an opposite side of the fulcrum;
   wherein the first discharge outlet on the first feed tank that is in fluid communication with the first segment to permit fluid discharged from the first feed tank to flow along the first segment;
   a first ballast tank in operative communication with the first feed tank;
   a second ballast tank;
   a first spill tank in fluid communication with the first feed tank by way of the lever and in operative communication with the first ballast tank;
   a third ballast tank connected to the first spill tank;
   a first mechanical system that couples the first feed tank to the first ballast tank,
   wherein the first feed tank and the first ballast tank move vertically opposite each other in response to rising and dropping tide levels;
   a volume defined by the first ballast tank that is greater than a volume defined by the first feed tank;
   a second mechanical system that couples a fourth ballast tank to the first spill tank and the third ballast tank;
   wherein the third ballast tank is vertically above the first spill tank;
   a volume defined by the first spill tank that is greater than or equal to a volume of the first feed tank; and
   a volume defined by the second ballast tank that is greater than a volume defined by the first spill tank.

2. The tidal energy converter of claim 1, further comprising:
   an electricity generator in operative communication with the lever adapted to generate electricity in response to movement of the lever.

* * * * *